(12) United States Patent
Maliverney et al.

(10) Patent No.: US 9,458,319 B2
(45) Date of Patent: Oct. 4, 2016

(54) ARTICLE WITH ANTIFOULING PROPERTIES, INTENDED FOR AQUATIC USES AND, IN PARTICULAR, FOR MARINE USES

(71) Applicant: BLUESTAR SILICONES FRANCE SAS, Lyons (FR)

(72) Inventors: Christian Maliverney, Saint Julien sur Bibost (FR); Delphine Blanc, Lyons (FR); Michel Feder, Villeurbanne (FR); Delphine Platel, Saint Maurice de Gourdans (FR)

(73) Assignee: BLUESTAR SILICONES FRANCE SAS, Lyons (FR)

( * ) Notice: Subject to any disclaimer, the term of this patent is extended or adjusted under 35 U.S.C. 154(b) by 0 days.

(21) Appl. No.: 14/653,049

(22) PCT Filed: Dec. 19, 2013

(86) PCT No.: PCT/FR2013/000353
§ 371 (c)(1),
(2) Date: Jun. 17, 2015

(87) PCT Pub. No.: WO2014/096571
PCT Pub. Date: Jun. 26, 2014

(65) Prior Publication Data
US 2015/0337144 A1    Nov. 26, 2015

(30) Foreign Application Priority Data

Dec. 20, 2012 (FR) ...................... 12 03531

(51) Int. Cl.
| | |
|---|---|
| *C08L 83/04* | (2006.01) |
| *C09D 5/16* | (2006.01) |
| *C09D 183/04* | (2006.01) |
| *C08G 77/08* | (2006.01) |
| *C08G 77/14* | (2006.01) |
| *B01J 31/18* | (2006.01) |
| *B01J 31/22* | (2006.01) |

(52) U.S. Cl.
CPC .............. *C08L 83/04* (2013.01); *C08G 77/08* (2013.01); *C08G 77/14* (2013.01); *C09D 5/1675* (2013.01); *C09D 5/1693* (2013.01); *C09D 183/04* (2013.01); *B01J 31/1805* (2013.01); *B01J 31/2226* (2013.01); *B01J 2531/26* (2013.01); *Y02P 20/52* (2015.11); *Y10T 428/31663* (2015.04)

(58) Field of Classification Search
None
See application file for complete search history.

(56) References Cited

U.S. PATENT DOCUMENTS

| | | | |
|---|---|---|---|
| 3,127,363 A | 3/1964 | Nitzsche et al. | |
| 3,702,778 A | 11/1972 | Mueller et al. | |
| 4,025,693 A | 5/1977 | Milne | |
| 4,410,677 A * | 10/1983 | Lampe ................... | C08K 5/098 524/265 |
| 4,515,932 A | 5/1985 | Chung | |
| 4,528,353 A | 7/1985 | Lucas et al. | |
| 4,563,498 A | 1/1986 | Lucas | |
| 5,519,104 A | 5/1996 | Lucas | |
| 6,245,952 B1 | 6/2001 | Mimoun | |
| 6,573,395 B2 * | 6/2003 | Mimoun .............. | B01J 31/1805 502/162 |
| 2007/0203297 A1 * | 8/2007 | Wakabayashi ...... | C08F 293/005 525/187 |
| 2008/0207938 A1 | 8/2008 | Prasse | |
| 2009/0092840 A1 * | 4/2009 | Schlumpf ............. | C08G 18/10 428/423.1 |
| 2011/0046304 A1 | 2/2011 | Maliverney | |
| 2011/0206936 A1 * | 8/2011 | Maliverney .......... | B01J 31/0251 428/447 |
| 2011/0212333 A1 * | 9/2011 | Maliverney ............ | B08B 17/02 428/447 |
| 2011/0287268 A1 * | 11/2011 | Blanc ................... | B01J 31/0237 428/447 |
| 2011/0305911 A1 * | 12/2011 | Blanc ..................... | A01N 55/00 428/447 |
| 2014/0343202 A1 * | 11/2014 | Dinkar ................. | B01J 31/2234 524/141 |
| 2014/0378612 A1 * | 12/2014 | Dinkar .................... | C08L 83/04 524/860 |

FOREIGN PATENT DOCUMENTS

| | | |
|---|---|---|
| CA | 991929 A1 | 6/1976 |
| EP | 0051930 A2 | 5/1982 |
| EP | 0885933 A1 | 12/1988 |
| FR | 2083029 A5 | 12/1971 |
| FR | 2266733 A1 | 10/1975 |
| FR | 2375305 A1 | 7/1978 |
| FR | 2557582 A1 | 7/1985 |
| FR | 2557585 A1 | 7/1985 |
| GB | 859724 A | 1/1961 |
| GB | 2118196 A | 10/1983 |
| WO | 2009133085 A1 | 11/2009 |

OTHER PUBLICATIONS

International Search Report from corresponding PCT/FR2013/000353, mailed May 8, 2014.
Noll, "Chemistry and Technology of Silicones", Chapter 8, Leverkusen, Germany, 1968, pp. 386-436.
U.S. Appl. No. 07/847,401, filed Mar. 6, 1992. See p. 3 of subject application.

* cited by examiner

Primary Examiner — Robert S Loewe
(74) Attorney, Agent, or Firm — McBee Moore Woodward Vanik, IP LLC

(57) ABSTRACT

The invention relates to an article with antifouling properties, intended for aquatic uses and, in particular, for marine uses, and to a method for slowing down the growth of aquatic organisms on submersible or semi-submersible structures.

17 Claims, No Drawings

ARTICLE WITH ANTIFOULING PROPERTIES, INTENDED FOR AQUATIC USES AND, IN PARTICULAR, FOR MARINE USES

CROSS REFERENCE TO RELATED APPLICATIONS

This application is a §371 National Stage Application of PCT/FR2013/000353, filed 19 Dec. 2013, which claims priority to FR 12/03531.

BACKGROUND

1. Field of the Invention

The present invention relates to an article with antifouling properties for use in aquatic applications, in particular marine applications, and also to a process for retarding the growth of aquatic organisms on submersible or semi-submersible structures.

2. Description of Related Art

The invention relates to the field of antifouling marine paints. Antifouling marine paints are top coats for preventing the attachment of animals or plants to ship hulls. They are used for safety reasons, for maintaining the manouverability of ships, for reducing the consumption of fuel, and for combating corrosion and the emburdening of structures.

The problem of "biofouling" is a major problem resulting from the submersion of materials into marine environments. A considerable maintenance cost is involved in preventing this phenomenon.

Specifically, the formation of "biofouling" or "fouling" takes place during submersion in seawater, in which a layer of organic and mineral molecules is adsorbed onto the surface of the material extremely rapidly. This layer of adsorbed material or "biofilm" serves as a mediator for the adhesion of the bacteria present in suspension in the marine environment.

This surface colonization by marine bacteria is rapid and a stationary state is reached after a period of a few hours to a few days. Finally, other marine organisms come to colonize the surface, the adherent bacteria recruiting these other organisms. This set of live organisms connected to the surface constitutes the "biofouling" or "fouling".

The adhesion of marine fouling concerns any structure submerged in the sea: ships, pipelines, cooling towers and circuits, port structures, marine sensors, aquaculture systems, etc. Diverse and extensive damage is thereby caused. Specifically, these structures become encrusted, for example, with organisms that have a negative effect on the performance qualities of the structures.

In particular, for ship hulls, the encrustation of various marine organisms increases the friction between the ship hulls and the seawater, which reduces the speed and may lead to greater fuel consumption. Thus, the bottom of a ship that is not protected with an antifouling system may, after less than six months spent at sea, be covered with 150 kg of fouling per square meter.

To avoid this economic loss, and also to better inhibit corrosion, paints known as antifouling paints are applied to the submerged parts of structures exposed to water, the purpose of these paints being to prevent or to notably reduce the encrustation fouling of marine organisms. The principle of antifouling paints is based on the controlled release of the active substance at the interface between the surface and the seawater. The efficacy of the paint is maintained as long as the concentration of active substance released at the surface is efficient and regular. The majority of antifouling paints thus contain a biocidal product which destroys marine organisms, which is usually an organometallic compound (based on tin, copper or zinc) or an organic compound (fungicide, algicide or bactericide) which prevents the adhesion of marine fouling via their toxic activity.

However, the problem associated with the use of these paints is that they release into the marine environment substances that are harmful to marine fauna and flora. Furthermore, the coatings become increasingly coarse by gradually degrading, which increases the fuel consumption and augments the hydrodynamic noise emitted by the submerged structure.

This novel difficulty has been solved by using self-cleaning antifouling paints. In addition to containing biocidal agents, these paints have, under the action of surface hydrolysis by seawater and that of erosion due to the movement of the ship, a regular and controlled loss of thickness over time. The slow erosion of the coating on contact with seawater allows the surface to be constantly renewed with biocidal agents.

The self-cleaning antifouling paints developed since the 1960s were based on tin salts. These are self-cleaning paints formulated with tributyltin (TBT) methacrylate copolymers which have a constant degree of leaching. The TBT grafted onto an acrylic binder is released slowly by hydrolysis in water. Examples of this type of paint are described in documents FR-A-2 266 733, FR-A-2 557 585, EP-A-0 051 930 and GB-A-2 118 196.

Tributyltin (TBT), which is very efficient, was thus the biocide most commonly used in antifouling paints, but this product, its degradation molecules and its metabolites have proven to be seriously and durably polluting. For these reasons, the International Maritime Organization has banned the use of tin-based antifouling paints.

The antifouling paints now used are mainly based on copper compounds and/or synthetic chemical compounds, but also based on polymers of silicone type.

For the copper-based paints, although they are less toxic than tin salts, they are virtually always formulated with a large proportion of cuprous oxide (see, for example, document EP-A-051 930 or FR-A-2 557 585), the main binder being based on special polymers generally of acrylic type. However, they are only effective against marine fauna, and, to combat the growth of algae, it is essential to add herbicides, which may place new threats on the environment.

This alternative therefore does not provide a durable solution for protecting the environment from the massive discharge of heavy ions, especially copper ions, following the intensive use of tin-free but copper-rich paints.

Another solution for preventing the fouling of the surfaces of structures in contact with seawater consists in covering these surfaces with at least one protective coating, the outer coat of the coating in contact with the water being a silicone elastomer. These coatings are prepared from paints known as "fouling-release coating" paints. The principle of these novel antifouling paints is to create a very smooth surface with a low surface energy, to which organisms have great difficulty in adhering. When a ship has stopped, these surfaces are stationary and marine organisms can be deposited thereon. However, by virtue of the suppleness and the low surface tension of the silicone-based top coat, these organisms are simply removed by the force of the movement of water or the effect of friction caused by the movement of the ship. This also means that if there is sufficient movement of water about the hull of a ship, a natural self-cleaning effect takes place.

By virtue of these properties, even ships that are less frequently at sea or in waters with less movement benefit from more spaced apart cleaning intervals. This is due to the fact that marine organisms have difficulty in adhering to the surface, which makes the cleaning easier.

These silicone-based paints forming an antifouling coating are thus very innovative:

they are totally friendly to the marine environment: no discharge of metals, and they improve the slippage of ships, thus reducing their fuel consumption by 1% to 5% and thus their emissions of greenhouse gases.

Many patents, for example patents FR-A-2 083 029 and U.S. Pat. No. 3,702,778, describe such coatings whose final coat, known as the "top coat", is made of hot-cured or cold-cured silicone elastomer.

For example, patent application U.S. Ser. No. 07/847,401, filed on Mar. 6, 1992, discloses an antifouling system containing three components, comprising at least one coat of an epoxy primer, an adhesion primer or fixing coat (tie coat) and an antifouling coat (top coat) based on silicone elastomer. The final coat of epoxy primer is normally a thin coat that is applied to obtain a clean and fresh surface onto which the tie coat can adhere. The tie coat comprises an organopolysiloxane and a curing constituent. The antifouling coat comprises an organopolysiloxane, an alkyl silicate and a curing agent or a separate tin-based catalyst. The coat(s) of epoxy primer are applied directly onto the support. The tie coat is applied onto the coat(s) of epoxy primer. The antifouling coat of silicone coating is then applied and crosslinked on the tie coat, after partial curling of the latter.

An antifouling coat (top coat) based on silicone elastomer may also comprise fluids that improve the "antifouling" effect, in particular:

methylphenylpolysiloxane oils (U.S. Pat. No. 4,025,693), a hydrocarbon-based liquid compound, for example a polyolefin, a plasticizer, a lubricant oil (FR-A-2 375 305), liquid paraffins and waxy masses such as petrolatum (JP-A-83/013 673), a thermoplastic polymer such as PVC, a vinyl chloride/vinyl acetate copolymer (Kokai JP-A-79/026 826), or cationic, anionic, nonionic or amphoteric surfactants (JP-A-85/258 271).

In order to form the silicone elastomer coating, the silicone formulations used generally involve a silicone oil, generally a reactive polydimethylsiloxane bearing hydroxyl end groups, optionally prefunctionalized with a silane so as to have alkoxy end groups, a crosslinking agent and a polycondensation catalyst, conventionally a tin salt or an alkyl titanate, a reinforcing filler and other optional additives such as packing fillers, adhesion promoters, colorants, etc.

These room-temperature vulcanizable organopolysiloxane compositions are well known and are classified into two distinct groups: one-pack compositions (RTV-1) and two-pack compositions (RTV-2). The term "RTV" is the abbreviation for "room-temperature vulcanizing".

During crosslinking, water (either provided by atmospheric humidity in the case of RTV-1, or introduced into part of the composition in the case of RTV-2 using catalysts based on tin carboxylate) allows the polycondensation reaction, which leads to the formation of the elastomer network.

Generally, the one-pack compositions (RTV-1) crosslink when they are exposed to atmospheric humidity, i.e. they cannot crosslink in a confined medium. For example, one-pack silicone compositions crosslink without heating according to a mechanism of hydrolysis of reactive functions of the acetoxysilane, ketiminoxysilane, alkoxysilane, etc. type, followed by condensation reactions between formed silanol groups and other residual reactive functions. The hydrolysis is generally carried out by virtue of water vapor which diffuses into the material from the surface exposed to the atmosphere. Generally, the polycondensation reaction kinetics are extremely slow; these reactions are thus catalyzed with a suitable catalyst. As catalysts which are used, use is most often made of catalysts based on tin, titanium, an amine or compositions of these catalysts. Catalysts based on tin (cf. in particular FR-A-2 557 582) and on titanium (cf. in particular FR-A-2 786 497) are catalysts that are very effective. One-pack silicone elastomers bearing —Si(OR) end groups are occasionally referred to as alkoxy elastomers.

As regards the compositions packaged in the form of two-pack products (RTV-2), a first component (or part) comprising compounds that are capable of polycondensing and the second component is airtight and contains the catalyst and usually one or more crosslinking agents. The two components (or parts) are mixed together during use and the mixture cures (via crosslinking reactions) in the form of a relatively hard elastomer, especially when the composition comprises reinforcing fillers. These compositions packaged in two-pack systems are well known and are described, in particular, in the book by Walter Noll "Chemistry and Technology of Silicones" 1968, 2nd Edition, on pages 395 to 398. These compositions usually comprise the following ingredients:

a reactive polydiorganosiloxane with silanol groups at the end of the chain (for example an α,ω-di(hydroxydimethylsilyl)(polydimethylsiloxane), in the chain or at the end of the chain and in the chain, a crosslinking agent, a condensation catalyst, and optionally water, often present when a dialkyltin dicarboxylate is used as catalyst (activation of this catalyst by the presence of water).

Usually, the condensation catalyst is based on an organic tin compound. Indeed, many tin-based catalysts have already been proposed as a catalyst for crosslinking these RTV-1 or RTV-2 compositions. Conventional polycondensation catalysts comprise dialkyltin compounds, especially dialkyltin dicarboxylates such as dibutyltin dilaurate and diacetate, alkyl titanate compounds such as tetrabutyl or tetraisopropyl titanate, or titanium chelates (EP-A-0 885 933, U.S. Pat. No. 5,519,104, U.S. Pat. No. 4,515,932, U.S. Pat. No. 4,563,498, U.S. Pat. No. 4,528,353).

However, the alkyltin-based catalysts, although very effective, usually colorless, liquid and soluble in silicone oils, have the drawback of being toxic (CMR2 toxic for reproduction).

For a durable development, it thus appears necessary to develop novel antifouling paints not comprising any toxic catalyst. For example, an important characteristic of a curable silicone composition is the working time (pot life or working time), i.e. the time for which the composition can be used after mixing without curing. This time should be long enough to allow its use, but short enough to obtain a hard coating. For example, for a coating of tie coat or top coat type, a working time of between 2 and 4 hours is generally required when the exterior temperature is between 20 and 30° C. Outside this range, one of the means for adjusting this working time is the nature of the components used such as the catalyst or the crosslinking agent.

For all these reasons, novel strategies for combating the adhesion of aquatic fouling and in particular marine fouling are now being developed.

SUMMARY

The aim of the invention is to propose an article that has antifouling properties by means of coatings obtained from antifouling paints not comprising any banned components (biocide or catalyst) and not containing any tin.

The present invention thus relates to an article with antifouling properties which is intended to be used in aquatic applications, in particular marine applications, comprising:
- a) a support (1),
- b) at least one adhesion-promoting coat (3) deposited on said support (1), and
- c) at least one antifouling coat (4) deposited on said adhesion-promoting coat (3), said article being characterized in that said antifouling coat (4) is obtained after deposition and curing on contact with atmospheric moisture of a composition Z comprising:
  - (i) at least one organosilicon compound A' comprising at least two identical or different hydrolyzable and condensable groups, or at least two silanol functions ≡SiOH,
  - (ii) at least one crosslinking agent B', and
  - (iii) a catalytically effective amount of at least one polycondensation catalyst M which is a zinc complex comprising in its structure two types of ligand: carboxylate and amine.

DETAILED DESCRIPTION OF A PREFERRED EMBODIMENT

To achieve this objective, the Applicant has, to its credit, demonstrated, entirely surprisingly and unexpectedly, that a polycondensation catalyst M according to the invention, which is a zinc complex comprising in its structure two types of ligands, carboxylate and amine, makes it possible to prepare antifouling coats or coatings that are useful as tie coat or top coat in antifouling applications. However, although having structural similarities, non-amino zinc dicarboxylate complexes are much less efficient as regards the rate of crosslinking and final properties of the antifouling coat obtained after curing on contact with atmospheric moisture. The coats or coatings obtained according to the invention have noteworthy adhesion properties on the supports thus treated, while at the same time giving a very smooth treated surface, with a low surface energy, to which organisms have great difficulty in adhering.

The catalysts according to the invention are used in the silicone systems to be crosslinked in very low contents, and make it possible, depending on the content, to adapt the working times to the application while at the same time ensuring excellent hardnesses of the elastomers obtained. The catalyst according to the invention may be in the solid or liquid state. It may be incorporated alone or in a suitable solvent. When it is in solvent, a silicone oil may be added, the solvent is then evaporated so as to transfer the catalyst into a silicone medium. The mixture obtained acts as a catalyzing base.

Preferentially, the polycondensation catalyst M is a zinc complex comprising in its structure at least two carboxylate ligands and at least one amine ligand, and even more preferentially, the polycondensation catalyst M is a zinc complex comprising in its structure:

at least two identical or different carboxylate ligands, and one or two amine ligands.

It is understood that the term "complex" includes in its definition any monomeric, oligomeric or similar form of said zinc complex according to the invention.

The inventors have also, to their credit, overcome the technical prejudice which maintained that, hitherto, certain complexes of metals, for instance zinc, had only mediocre activity in the polycondensation reaction of organopolysiloxanes.

The definition of ligands is taken from the publication "Chimie Organométallique" by Didier Astruc, published in 2000 by EDP Sciences. See especially Chapter 1, "Les complexes monométalliques", pages 31 et seq.

The catalyst according to the invention may be in the solid or liquid state. It may be incorporated alone or in a suitable solvent. When it is in solvent, a silicone oil or any other compatible solvent such as petroleum fractions may be added, and the solvent is then evaporated so as to transfer the catalyst into a silicone medium. The mixture obtained may then serve as a "catalyzing base".

According to a preferred embodiment, the polycondensation catalyst(s) M may be obtained:

a) by reacting per 1 mol of at least one zinc dicarboxylate of formula [Zn (carboxylate)$_2$] or of a mixture of two different zinc carboxylates, $X^1$ mol of amine or a mixture of amines optionally in the presence of a solvent, so as to obtain a reaction product comprising:

x mol of a zinc complex A which is a complex [(Zn (carboxylate)$_2$(amine)], y mol of a zinc complex B which is a complex [(Zn (carboxylate)$_2$(amine)$_2$], with x≥0, y≥0, optionally $X^3$ mol of the unreacted zinc dicarboxylate, and optionally $X^4$ mol of residual unreacted amine, and b) after optionally removal of the solvent and of the residual amine, the polycondensation catalyst(s) M are recovered in the form of at least one zinc complex A, at least one zinc complex B or a mixture of zinc complex A and of zinc complex B, with optionally a residual amount of $X^3$ mol of the complex [Zn (carboxylate)$_2$], and the symbols $X^1$, $X^3$ and $X^4$ are numbers and the sum $x+y+X^3=1$.

The removal of the solvent or of the residual amine will be performed via any known technique (distillation, filtration, etc.). It is known that structures [Zn(carboxylate)$_2$ (amine)] or [Zn(carboxylate)$_2$(amine)$_2$] may also form dimers, trimers or tetramers. Consequently, the definition of the catalyst according to the invention also includes the dimeric, trimeric or tetrameric forms of said catalyst according to the invention.

Depending on the type of polycondensation catalyst M desired (monoamino or diamino zinc dicarboxylate complex, or a mixture of these species), the number of moles of amine $X^1$ will be adjusted in consequence:

$X^1$≥2 molar equivalents relative to the zinc to predominantly obtain a zinc diamine dicarboxylate complex B, 1≤$X^1$<2 molar equivalents relative to the zinc to predominantly obtain a mixture of zinc diamine dicarboxylate complex B and zinc monoamine dicarboxylate complex A, $X^1$<1 molar equivalent relative to the zinc to predominantly obtain a mixture of zinc monoamine dicarboxylate complex A and of unreacted complex [Zn(carboxylate)$_2$].

The complexes of zinc dicarboxylate type are mostly commercially available or may be readily prepared, for example by adding zinc chloride in methanolic solution to a solution of sodium carboxylate in a solvent such as a toluene-methanol mixture. After distilling off the methanol, filtering off the sodium chloride formed and evaporating off the toluene, the corresponding zinc dicarboxylate is obtained.

Another known method consists in pouring a sodium carboxylate into a solution of zinc nitrate while maintaining the pH of the solution in the region of 5 and optionally at a temperature in the region of 40° C. The precipitate obtained is then filtered off, optionally washed with distilled water and then dried to give the corresponding zinc dicarboxylate.

To prepare mixed zinc dicarboxylate complexes, i.e. with two different types of carboxylate ligands, it is possible to add simultaneously two types of sodium carboxylates optionally in equimolar proportion to the zinc nitrate in aqueous solution. The reaction product is a mixed zinc dicarboxylate optionally in hydrated form.

According to a particular embodiment, the invention relates to an article comprising:
a) a support (1),
b) at least one primer coat (2) deposited on said support (1) comprising at least one anticorrosion product,
c) at least one adhesion-promoting coat (3) deposited on said primer coat (2), and
d) at least one antifouling coat (4) deposited on said adhesion-promoting coat (3), said article being characterized in that said antifouling coat (4) is obtained after deposition and curing on contact with atmospheric moisture of a composition Z comprising:
(i) at least one organosilicon compound A' comprising at least two identical or different hydrolyzable and condensable groups, or at least two silanol functions ≡SiOH,
(ii) at least one crosslinking agent B', and
(iii) a catalytically effective amount of at least one polycondensation catalyst M which is a zinc complex comprising in its structure two types of ligand: carboxylate and amine.

According to a preferred embodiment, the composition Z comprises:
(i) at least one organosilicon compound A' comprising at least two identical or different hydrolyzable and condensable groups, or at least two silanol functions ≡SiOH,
(ii) at least one crosslinking agent B', and
(iii) a catalytically effective amount of at least one polycondensation catalyst M which is a complex of formula (1') below:

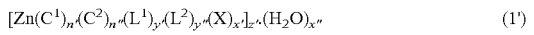

in which:
the symbols $C^1$ and $C^2$ are identical or different ligands chosen from the group of carboxylates,
the symbols n' and n" represent the number of carboxylate ligands and are integers equal to 0, 1 or 2 with the condition that the sum n'+n"=2,
the symbols $L^1$ and $L^2$ are identical or different ligands chosen from the group of amines,
the symbols y' and y" represent the number of amine ligands and are integers equal to 0, 1 or 2 with the condition that the sum y'+y"=1 or 2,
the symbol X is a ligand other than $C^1$, $C^2$, $L^1$ and $L^2$ and preferably a neutral ligand other than an amine and even more preferentially X is an $H_2O$ molecule,
the symbol x'≥0, and preferably x'=0, 1, 2, 3 or 4,
the symbol x"≥0, and preferably x"=0, 1, 2, 3 or 4, and
the symbol z' is an integer greater than or equal to 1 and preferably z'=1 or 2.

The ligand X is preferably a neutral ligand other than an amine, and the structure of which is of little importance. A person skilled in the art will use any type of precursor during the preparation of the catalyst M according to the invention such that this neutral ligand does not interfere with the reactivity of the catalyst. An example of a neutral ligand is, for example, a water molecule.

Preferably, the polycondensation catalyst M is a complex of formula (2') below:

in which:
the symbols $C^1$ and $C^2$ are identical or different ligands chosen from the group of carboxylates,
the symbols n' and n" represent the number of carboxylate ligands and are integers equal to 0, 1 or 2 with the condition that the sum n'+n"=2,
the symbols $L^1$ and $L^2$ are identical or different ligands chosen from the group of amines,
the symbols y' and y" represent the number of amine ligands and are integers equal to 0, 1 or 2 with the condition that the sum y'+y"=1 or 2, and
the symbol z' is an integer greater than or equal to 1 and preferably z'=1 or 2 and even more preferentially z'=1.

According to another preferred embodiment, the polycondensation catalyst M is a complex of formula (3') below:

in which:
the symbol $C^1$ is a ligand chosen from the group of carboxylates,
the symbol $L^1$ is a ligand chosen from the group of amines,
the symbol y' is a number equal to 1 or 2, and
the symbol z' is an integer greater than or equal to 1 and preferably the symbol z'=1, 2, 3 or 4, and even more preferentially z'=1 or 2.

Examples of amines that are useful as ligands $L^1$ or $L^2$ are, for example, the following amidines: N'-cyclohexyl-N,N-dimethylformamidine, N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl)morpholine, N-([α]-(decyliminoethyl)ethyl)pyrrolidine, N'-decyl-N,N-dimethylformamidine, N'-dodecyl-N,N-dimethylformamidine, N'-cyclohexyl-N,N-acetamidine.

Other amines that are useful as ligands $L^1$ or $L^2$ are, for example, heterocyclic derivatives of imidazoline, imidazole, tetrahydropyrimidine, dihydropyrimidine, pyridine, pyrrolidine, piperidine or pyrimidine type. Use may also be made of acyclic amidines or guanidines.

Examples of imidazole ligands are the following compounds: N-(2-hydroxyethyl)imidazole, N-(3-aminopropyl)imidazole, 4-(hydroxymethyl)imidazole, 1-(tert-butoxycarbonyl)imidazole, 4-carboxyimidazole, 1-butylimidazole, 4-formylimidazole, 1-(ethoxycarbonyl)imidazole, 2-methylimidazole, 1-trimethylsilylimidazole, 1-(p-toluenesulfonyl)imidazole, 1,1'-carbonylbisimidazole and 1-(2-cyanoethyl)-2-ethyl-4-methylimidazole.

Examples of imidazoline ligands are the following compounds: 1H-imidazole-1-ethanol, 2-(8Z)-8-heptadecenyl-4,5-dihydro, 1H-imidazole-1-ethanol, 1H-imidazole-1-ethanol, 1H-imidazole, 4,5-dihydro, -2-(9Z)-9-octadecenyl, oleyl hydroxyethylimidazoline, 1H-imidazole-1-ethanol, 4,5-dihydro-2-undecyl-, 1H-imidazole-1-ethanol, 2-heptadecyl-4,5-dihydro and 1H-imidazole-1-ethanol, 2-nonyl-4,5-dihydro.

Preferably, the ligand of amine type $L^1$ or $L^2$ is chosen from the group consisting of: primary monoamines of alkylamine type containing in total from 1 to 40 carbon atoms for the alkyl radical, secondary monoamines of dialkylamine type containing in total from 2 to 40 carbon atoms for the alkyl radicals, tertiary monoamines of trialkylamine type containing in total from 3 to 60 carbon atoms for the alkyl radicals, alkyl diamines containing in total from 1 to 40 carbon atoms for the alkyl radicals and amino silanes, and even more preferentially the ligands $L^1$ and $L^2$ are chosen from the group consisting of secondary monoamines of dialkylamine type containing in total from 2 to 20 carbon atoms and primary monoamines of alkylamine type containing in total from 1 to 40 carbon atoms for the alkyl radical.

Ligands $L^1$ or $L^2$ that are useful according to the invention are the amines chosen from the group consisting of the following amines: N,N-dimethylethylenediamine, N,N'-dimethylethylenediamine, N,N,N'-trimethylethylenediamine, N,N'-diisopropylethylenediamine, n-butylamine, n-propylamine, n-heptylamine, n-octylamine, n-nonylamine, tert-butylamine, isopropylamine, 2-ethylhexylamine, decylamine, dodecylamine, which may be linear or branched, N-methyl-N-butylamine, N,N-dipropylamine, N,N-diisopropylamine, N-ethyl-N-butylamine, N,N-dibutylamine, N,N-dimethyl-N-butylamine, di(n-octyl)amine, N-n-propylethylenediamine, N,N,N',N'-tetramethylethylenediamine, 3-aminopropyltrimethoxysilane and 3-aminopropylmethyldiethoxysilane.

Another list of amine ligands $L^1$ or $L^2$ that are useful according to the invention are the following amines:
Primary amines: N-propylamine, N-isopropylamine, N-butylamine, N-benzylamine, N-hexylamine, N-cyclohexylamine, N-n-octylamine, N-(2-ethylhexyl)amine, N-(2-phenylethyl)amine, N-(3-methoxypropyl)amine, N-nonylamine, N-isononylamine, N-decylamine, N-dodecylamine, ethylenediamine and 1,3-diaminopropane.
Secondary amines: N,N-dipropylamine, N,N-diisopropylamine, N,N-dibutylamine, N,N-dihexylamine, N,N-dicyclohexylamine, N,N-bis(2-methoxyethyl)amine, N,N-dioctylamine, N,N-bis(2-ethylhexyl)amine, N,N-diisononylamine, N,N-bis(tridecyl)amine, morpholine, piperidine, pyrrolidine, 2,2,6,6-tetramethylpiperidine, piperazine, N,N'-dimethylethylenediamine, N,N'-diethylethylenediamine and N,N'-diisopropylethylenediamine.

The carboxylate ligands $C^1$ and $C^2$ that are useful according to the invention are, for example:
anions derived from aliphatic carboxylic acids such as the following anions: methoxide or formate [H—COO]$^-$, ethoxide or acetate [CH$_3$—COO]$^-$, propanoate or propionate [CH$_3$CH$_2$—COO]$^-$, butanoate or butyrate [CH$_3$—(CH$_2$)$_2$—COO]$^-$, pentanoate or valerate [CH$_3$—(CH$_2$)$_3$—COO]$^-$, hexanoate or caproate [CH$_3$—(CH$_2$)$_4$—COO]$^-$, heptanoate [CH$_3$—(CH$_2$)$_5$—COO]$^-$, octanoate [CH$_3$—(CH$_2$)$_6$—COO]$^-$, 2-ethylhexanoate [CH$_3$—(CH$_2$)$_4$—CH(C$_2$H$_5$)—COO]$^-$, nonanoate [CH$_3$—(CH$_2$)$_7$—COO]$^-$, decanoate [CH$_3$—(CH$_2$)$_8$—COO]$^-$, undecanoate [CH$_3$—(CH$_2$)$_9$—COO]$^-$, dodecanoate or laurate [CH$_3$—(CH$_2$)$_{10}$—COO]$^-$ tridecanoate [CH$_3$—(CH$_2$)$_{11}$—COO]$^-$, tetradecanoate or myristate [CH$_3$—(CH$_2$)$_{12}$—COO]$^-$, pentadecanoate [CH$_3$—(CH$_2$)$_{13}$—COO]$^-$, hexadecanoate or palmitate [CH$_3$—(CH$_2$)$_{14}$—COO]$^-$ heptadecanoate [CH$_3$—(CH$_2$)$_{15}$—COO]$^-$, octadecanoate or stearate [CH$_3$—(CH$_2$)$_{16}$—COO]$^-$, nonadecanoate [CH$_3$—(CH$_2$)$_{17}$—COO]$^-$, eicosanoate [CH$_3$—(CH$_2$)$_{18}$—COO]$^-$, heneicosanoate [CH$_3$—(CH$_2$)$_{19}$—COO]$^-$, docosanoate or behenate [CH$_3$—(CH$_2$)$_{20}$—COO]$^-$, tricosanoate [CH$_3$—(CH$_2$)$_{21}$—COO]$^-$, tetracosanoate or lignocerate [CH$_3$—(CH$_2$)$_{22}$—COO]$^-$, pentacosanoate [CH$_3$—(CH$_2$)$_{23}$—COO]$^-$, hexacosanoate [CH$_3$—(CH$_2$)$_{24}$—COO]$^-$, hydrogen heptacosanoate [CH$_3$—(CH$_2$)$_{25}$—COO]$^-$, octacosanoate [CH$_3$—(CH$_2$)$_{26}$—COO]$^-$, nonacosanoate [CH$_3$—(CH$_2$)$_{27}$—COO]$^-$, triacontanoate [CH$_3$—(CH$_2$)$_{28}$—COO]$^-$, hentriacontanoate [CH$_3$—(CH$_2$)$_{29}$—COO]$^-$, dotriacontanoate [CH$_3$—(CH$_2$)$_{30}$—COO]$^-$, palmitoleate [CH$_3$—(CH$_2$)$_5$—CH=CH—(CH$_2$)$_7$—COO]$^-$, oleate [CH$_3$(CH$_2$)$_7$CH=CH(CH$_2$)$_7$COO]$^-$, linoleate [CH$_3$—(CH$_2$)$_4$—(CH=CHCH$_2$)$_2$—(CH$_2$)$_6$—COO]$^-$, linolenate [CH$_3$—CH$_2$—(CH=CHCH$_2$)$_3$—(CH$_2$)$_6$—COO]$^-$, arachidonate [CH$_3$—(CH$_2$)$_4$—(CH=CHCH$_2$)$_4$—(CH$_2$)$_2$—COO]$^-$, the following $C_{10}$ structural isomers, taken alone or as a mixture (neodecanoate): 7,7-dimethyloctanoate [(CH$_3$)$_3$C—(CH$_2$)$_5$—COO]$^-$, 2,2-dimethyloctanoate [CH$_3$—(CH$_2$)$_5$—C(CH$_3$)$_2$—COO]$^-$, 2,2,3,5-tetramethylhexanoate [(CH$_3$)$_2$CH—CH$_2$—CH(CH$_3$)—C(CH$_3$)$_2$—COO]$^-$, 2,5-dimethyl-2-ethylhexanoate [(CH$_3$)$_2$CH—(CH$_2$)$_2$—C(CH$_3$)(C$_2$H$_5$)—COO]$^-$, 2,2-diethylhexanoate [CH$_3$—(CH$_2$)$_3$—C(C$_2$H$_5$)$_2$—COO]$^-$, 2,4-dimethyl-2-isopropylpentanoate [(CH$_3$)$_2$CH—CH$_2$—C(CH$_3$)(isopropyl)-COO]$^-$, the corresponding carboxylates of Versatic™ 10 acid (sold by the company Momentive) of empirical formula [C$_{10}$H$_{19}$O$_2$]$^-$ and of linear formula [(R$^1$)(R$^2$)C(CH$_3$)—COO]$^-$ with the symbols R$^1$ and R$^2$ which are alkyls, or anions derived from aromatic carboxylic acids such as anions of the type such as benzoate, phenylacetate, phenylpropionate, phenylbutyrate or naphthenate.

The term "aliphatic" means that it is a linear or branched, saturated or unsaturated acyclic or cyclic carbon-based organic compound, with the exclusion of aromatic compounds.

It is particularly advantageous for the polycondensation catalyst M to comprise in its chemical structure ligands of carboxylate type $C^1$ and $C^2$ which are chosen from the group consisting of the carboxylates of empirical formula [C$_{10}$H$_{19}$O$_2$]$^-$ and even more preferentially chosen from the group consisting of neodecanoate and naphthenate.

According to another preferred embodiment, the symbols $C^1$ and $C^2$ are identical or different carboxylate ligands chosen from the group of anions of empirical formula [C$_n$H2$_{n-1}$O$_2$]$^-$, in which formula the symbol n is an integer from 1 to 40, preferably from 1 to 32 and even more preferentially from 2 to 30.

Polycondensation catalysts M that are particularly advantageous are the complexes of formula (3') below:

(3')

in which:
the symbol $C^1$ is a neodecanoate ligand, naphthenate ligand or a 2-ethylhexanoate ligand,
the symbol $L^1$ is a ligand chosen from the group consisting of the following compounds: N,N-dimethylethylenediamine, N,N'-dimethylethylenediamine, N,N,N'-trimethylethylenediamine N,N'-diisopropylethylenediamine, n-butylamine, n-propylamine, n-heptylamine, n-octylamine, n-nonylamime, tert-butylamine, isopropylamine, 2-ethylhexylamine, decylamine, dodecylamine, which may be linear or branched, N-methyl-N-butylamine, N,N-dipropylamine, N,N-diisopropylamine, N-ethyl-N-butylamine, N,N-dibutylamine, N,N-dimethyl-N-butylamine, di(n-octyl)amine, N-n-propylethylenediamine, N,N'-dimethylethylenediamine, N,N,N',N'-tetramethylethylene-diamine, 3-aminopropyltrimethoxysilane and 3-aminopropylmethyldiethoxysilane.

the symbol y' is an integer equal to 1 or 2, and the symbol z'=1, 2, 3 or 4 and preferably z'=1 or 2.

A polycondensation catalyst M that is particularly advantageous according to the invention is a complex chosen from the group consisting of the following complexes:

[Zn(naphthenate)$_2$(bis(2-ethylhexyl)amine)],
[Zn(naphthenate)$_2$(bis(2-ethylhexyl)amine)$_2$],
[Zn(naphthenate)$_2$(diisononylamine)],
[Zn(naphthenate)$_2$(diisononylamine)$_2$],
[Zn(naphthenate)$_2$(di(n-octyl)amine)],
[Zn(naphthenate)$_2$(di(n-octyl)amine)$_2$],
[Zn(naphthenate)$_2$(n-octylamine)],
[Zn(naphthenate)$_2$(n-octylamine)$_2$],
[Zn(naphthenate)$_2$(N,N-dibutylamine)],
[Zn(naphthenate)$_2$(N,N-dibutylamine)$_2$],
[Zn(naphthenate)$_2$(N,N-dimethyl-N-butylamine)$_2$],
[Zn(naphthenate)$_2$(N,N-dimethyl-N-butylamine)$_2$],
[Zn(naphthenate)$_2$(aminoethyl-aminopropyltrimethoxysilane)],
[Zn(naphthenate)$_2$(aminoethyl-aminopropyltrimethoxysilane)$_2$],
[Zn(naphthenate)$_2$(aminopropyltriethoxysilane)],
[Zn(naphthenate)$_2$(aminopropyltriethoxysilane)$_2$],
[Zn(neodecanoate)$_2$(di(n-octyl)amine)],
[Zn(neodecanoate)$_2$(di(n-octyl)amine)]$_2$],
[Zn(neodecanoate)$_2$(n-octylamine)],
[Zn(neodecanoate)$_2$(n-octylamine)$_2$],
[Zn(neodecanoate)$_2$(N,N-dibutylamine)],
[Zn(neodecanoate)$_2$(N,N-dibutylamine)$_2$],
[Zn(neodecanoate)$_2$(3-aminopropyltrimethoxysilane)$_2$],
[Zn(neodecanoate)$_2$(3-aminopropylmethyldiethoxysilane)$_2$],
[Zn(neodecanoate)$_2$(aminoethyl-aminopropyltrimethoxysilane)],
[Zn(neodecanoate)$_2$(aminoethyl-aminopropyltrimethoxysilane)$_2$],
[Zn(neodecanoate)$_2$ (aminopropyltriethoxysilane)],
[Zn(neodecanoate)$_2$ (aminopropyltriethoxysilane)$_2$],
[Zn(neodecanoate)$_2$(bis(2-ethylhexyl)amine)],
[Zn(neodecanoate)$_2$(bis(2-ethylhexyl)amine)$_2$],
[Zn(neodecanoate)$_2$(diisononylamine)],
[Zn(neodecanoate)$_2$(diisononylamine)$_2$],
[Zn(2-ethylhexanoate)$_2$(N,N-dibutylamine)]
[Zn(2-ethylhexanoate)$_2$(N,N-dibutylamine)$_2$],
[Zn(2-ethylhexanoate)$_2$(n-octylamine)],
[Zn(2-ethylhexanoate)$_2$(n-octylamine)$_2$],
[Zn(2-ethylhexanoate)$_2$bis(2-ethylhexyl)amine)],
[Zn(2-ethylhexanoate)$_2$(bis(2-ethylhexyl)amine)$_2$],
[Zn(2-ethylhexanoate)$_2$(diisononylamine)],
[Zn(2-ethylhexanoate)$_2$(diisononylamine)$_2$] and mixtures thereof.

The amount of polycondensation catalysts M according to the invention is between 0.01% and 10% by weight relative to the total mass of composition Z, preferably between 0.1% and 5%, whether it is a one-pack or two-pack preparation.

Preferably, the organosilicon compound A' is a polyorganosiloxane comprising:

(i) at least two siloxyl units of formula (4') below:

$$R^1_a Z_b SiO_{\left(\frac{4-(a+b)}{2}\right)} \qquad (4')$$

in which:

the symbols $R^1$, which may be identical or different, represent $C_1$ to $C_{30}$ monovalent hydrocarbon-based radicals, the symbols Z, which may be identical or different, each represent a hydrolyzable and condensable group or a hydroxyl group and are preferably chosen from the group consisting of groups of the following types: hydroxyl, alkoxy, alkoxy-alkylene-oxy, amino, amido, acylamino, aminoxy, iminoxy, ketiminoxy, acyloxy, iminoxy, ketiminoxy and enoxy and even more preferentially Z is a hydroxyl group, a is equal to 0, 1 or 2, b is equal to 1, 2 or 3, the sum a+b is equal to 1, 2 or 3, (ii) and optionally one or more siloxyl units of formula (5') below:

$$R_c SiO_{\left(\frac{4-c}{2}\right)} \qquad (5')$$

in which:

the symbols R, which may be identical or different, represent $C_1$ to $C_{30}$ monovalent hydrocarbon-based radicals optionally substituted with one or more halogen atoms or with amino, ether, ester, epoxy, mercapto or cyano groups, and the symbol c is equal to 0, 1, 2 or 3.

Preferably, the organosilicon compound A' according to the invention will bear at least two groups chosen from the group consisting of groups such as hydroxyl, alkoxy, alkoxy-alkylene-oxy, amino, amido, acylamino, aminoxy, iminoxy, ketiminoxy, acyloxy and enoxy.

Another important aspect for a composition that is crosslinkable via condensation reactions is the working time (pot life), that is to say the time during which the composition may be used after mixing without curing. For example, in a molding application, this time must be long enough to allow its use, but short enough to obtain a molded object that can be manipulated no longer than a few minutes or a few hours after its manufacture. The catalyst must thus make it possible to obtain a good compromise between the time of use of the catalyzed mixture and the time after which the molded object is manipulable (these times being dependent on the intended application, for instance molding or the manufacture of seals). In addition, the components that are reactive in the presence of the catalyst must confer, on the catalyzed mixture, a spreading time which does not vary as a function of the storage time.

Thus, when the organosilicon compound A' is a polyorganosiloxane bearing at least two hydroxyl groups (of silanol type ≡SiOH), it has been discovered, surprisingly and unexpectedly, that when it is used in a composition according to the invention which comprises as catalyst a zinc complex bearing carboxylate and amine ligands according to the invention, it is then possible to increase or decrease the "working time" (or pot life) by simply varying the molar mass of the organosilicon compound A' within a specific range. Thus, by varying the weight-average molar masses ($M_w$) of the organosilicon compound A' within a range of values greater than at least twice the entanglement molar mass $M_e$, it is then possible to modify the "working time" (or pot life) without deteriorating the mechanical properties (for example the shore A hardness) of the elastomer obtained after crosslinking. Without being bound by theory, the formation of points of entanglement starting from a certain length of macromolecular chains for each type of polyorganosiloxane is thus possible starting from a certain entanglement molar mass of the polymer identified by the symbol "$M_e$". Thus, the "critical molar mass" noted $M_c$ is defined as being equal to about twice the entanglement molar mass $M_e$. Above the critical molar mass $M_c$, it was thus possible to control the "working time" (or pot life) of the silicone composition before crosslinking.

As a guide and depending on the type of group present in the polyorganosiloxane bearing at least two hydroxyl groups of silanol type ≡SiOH, the entanglement molar mass $M_e$ is between 15 000 and 30 000 g/mol.

Thus, an advantageous embodiment consists in using an organosilicon compound A' which is a polyorganosiloxane bearing at least two hydroxyl groups of silanol type ≡SiOH whose weight-average molar mass $M_w$ is greater than at least twice the entanglement molar mass $M_e$. Controlling, by virtue of the choice of the weight-average molar mass Mw of the organosilicon compound A', the presence or absence of entanglement of the polyorganosiloxane chains bearing at least two hydroxyl groups of silanol type ≡SiOH makes it possible simultaneously to control:

the mechanical properties of the elastomer obtained after crosslinking of the composition according to the invention and especially the shore A hardness, and the "working time" during which the composition is manipulable before crosslinking.

Controlling the entanglement of the chains of the polyorganosiloxane bearing at least two hydroxyl groups of silanol type ≡SiOH will be performed by carefully selecting the weight-average molar mass $M_w$ of the polymer so that its molar mass is at least twice as large as the entanglement molar mass, i.e. it will be greater than the critical molar mass $M_c$ of this polymer.

Preferably, the organosilicon compound A' is a polyorganosiloxane of general formula (6'):

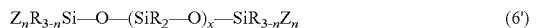  (6')

in which:
the symbols Z, which may be identical or different, each represent a hydrolyzable and condensable group or a hydroxyl group and are preferably chosen from the group consisting of groups of the following types: hydroxyl, alkoxy, alkoxy-alkylene-oxy, amino, amido, acylamino, aminoxy, iminoxy, ketiminoxy, acyloxy and enoxy, the symbols R, which may be identical or different, represent $C_1$ to $C_{30}$ monovalent hydrocarbon-based radicals optionally substituted with one or more halogen atoms or with amino, ether, ester, epoxy, mercapto or cyano groups, the symbol n is equal to 1, 2 or 3, preferably equal to 2 or 3 and when Z is a hydroxyl group, then n=1, the symbol x is between 200 and 1000, preferably between 200 and 1000 and even more preferentially between 250 and 600.

In formulae (4'), (5') and (6'), the symbols $R^1$ and R are preferably:

alkyl radicals containing from 1 to 20 carbon atoms optionally substituted with: 1 or more aryl or cycloalkyl groups, with one or more halogen atoms or with amino, ether, ester, epoxy, mercapto, cyano or (poly)glycol groups. Examples that may be mentioned include methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals, cycloalkyl and halocycloalkyl radicals containing from 5 to 13 carbon atoms, such as cyclopentyl, cyclohexyl, methylcyclohexyl, propylcyclohexyl, 2,3-difluorocyclobutyl and 3,4-difluoro-5-methylcycloheptyl radicals, mononuclear aryl and haloaryl radicals containing from 6 to 13 carbon atoms, such as phenyl, tolyl, xylyl, chlorophenyl, dichlorophenyl or trichlorophenyl radicals, or alkenyl radicals containing from 2 to 8 carbon atoms, such as vinyl, allyl or 2-butenyl radicals.

The viscosity of the organosilicon compound A' is generally between 50 and 5 000 000 mPa·s at 25° C. It is pointed out that the viscosity values in the present specification are the dynamic viscosity values measured at 25° C. using a Brookfield viscometer.

In the particular case where the organosilicon compound A' is a polyorganosiloxane of general formula (6) with symbols Z of hydroxyl type, then the symbol n will preferably be equal to 1. In this case, it is preferred to use polydimethylsiloxanes bearing dimethylhydroxysilyl end groups which are generally oils with a dynamic viscosity at 25° C. ranging, for example, between 500 mPa·s and 200 000 mPa·s at 25° C. When it is desired to control the working time, it will be arranged such that the choice of the organosilicon compound A is made as a function of the weight-average molar mass $M_w$ ($M_w$ greater than at least twice the entanglement molar mass $M_e$). For a molding application and when the compound is a polydimethylsiloxane ending with silanol functions (≡SiOH), its viscosity will preferably be greater than 750 mPa·s and even more preferentially between 1000 mPa·s and 20 000 mPa·s.

When the organosilicon compound A' is a polyorganosiloxane, it is advantageous to use those of which at least 60% of the radicals R and $R^1$ (in formulae 4 and 5) or of the radical R (in formula 6) are methyl radicals, the other radicals generally being phenyl and/or vinyl radicals.

According to the invention, the symbols Z each represent a hydroxyl group or a hydrolyzable and condensable group which are preferably chosen from the group consisting of the following groups: alkoxy, alkoxy-alkylene-oxy, amino, amido, acylamino, aminoxy, iminoxy, ketiminoxy, acyloxy and enoxy, When the organosilicon compound A' contains hydrolyzable and condensable groups Z according to the invention and is a polyorganosiloxane, it is usually described as a functionalized polymer and corresponds to a form that is stable in the absence of moisture which may be used in a one-pack composition and may thus be packaged in a hermetically sealed jar, cartridge or drum, which will be opened by the operator during use for application to the support to be treated. When the organosilicon group A' contains groups Z of hydroxyl type, they may be functionalized in situ in the one-pack compositions, via a functionalization catalyst such as lithium hydroxide, so as to be able to store them and package them in hermetically sealed cartridges.

As examples of hydrolyzable and condensable groups Z of alkoxy type, mention may be made of groups containing from 1 to 8 carbon atoms, such as methoxy, ethoxy, n-propoxy, isopropoxy, n-butoxy, isobutoxy, sec-butoxy, tert-butoxy, 2-methoxyethoxy, hexyloxy or octyloxy groups.

As an example of hydrolyzable and condensable groups Z of alkoxy-alkylene-oxy type, mention may be made of the methoxy-ethylene-oxy group.

As examples of hydrolyzable and condensable groups Z of amino type, mention may be made of methylamino, dimethylamino, ethylamino, diethylamino, n-butylamino, sec-butylamino or cyclohexylamino groups.

As an example of hydrolyzable and condensable groups Z of amido type, mention may be made of the N-methylacetamido group.

As an example of hydrolyzable and condensable groups Z of acylamino type, mention may be made of the benzoylamino group.

As examples of hydrolyzable and condensable aminoxy groups Z, mention may be made of dimethylaminoxy, diethylaminoxy, dioctylaminoxy or diphenylaminoxy groups.

As examples of hydrolyzable and condensable groups Z of iminoxy and in particular ketiminoxy type, mention may be made of groups derived from the following oximes: acetophenone oxime, acetone oxime, benzophenone oxime, methylethylketoxime, diisopropylketoxime or methylisobutylketoxime.

As an example of hydrolyzable and condensable groups Z of enoxy type, mention may be made of the 2-propenoxy group.

According to a preferred embodiment, the crosslinking agent B' is a silicon compound, each molecule of which comprises at least three hydrolyzable and condensable groups Y and said crosslinking agent B' having the formula (7') below:

$$R'_{(4-a)}SiY_a \qquad (7')$$

in which formula:
the symbol R' is a monovalent hydrocarbon-based radical comprising from 1 to 30 carbon atoms,
the symbol Y is an alkoxy, alkoxy-alkylene-oxy, amino, amido, acylamino, aminoxy, iminoxy, ketiminoxy, acyloxy or enoxy group and preferably Y is an alkoxy, acyloxy, enoxy, ketiminoxy or oxime group,
the symbol a=3 or 4.

Examples of groups Y are the same as those mentioned above when the symbol Z is a hydrolyzable and condensable group, i.e. other than a hydroxyl group.

As examples of crosslinking agent B', mention may be made of the alkoxysilanes of general formula (8) below, and the products of partial hydrolysis of this silane:

$$R^2_k Si(OR^3)_{(4-k)} \qquad (8)$$

in which:
the symbols $R^2$, which may be identical or different, represent alkyl radicals containing from 1 to 8 carbon atoms, such as methyl, ethyl, propyl, butyl, pentyl, 2-ethylhexyl radicals or $C_3$-$C_6$ oxyalkylene radicals,
the symbol $R^3$ represents a saturated or unsaturated, linear or branched aliphatic hydrocarbon-based group, a saturated or unsaturated and/or aromatic, monocyclic or polycyclic carbocyclic group,
and k is equal to 0, 1 or 2.

As examples of $C_3$-$C_6$ alkoxyalkylene radicals, mention may be made of the following radicals:
$CH_3OCH_2CH_2$—
$CH_3OCH_2CH(CH_3)$—
$CH_3OCH(CH_3)CH_2$—
$C_2H_5OCH_2CH_2CH_2$—

The symbol $R^3$ preferably represents a $C_1$-$C_{10}$ hydrocarbon-based radical that encompasses:
$C_1$-$C_{10}$ alkyl radicals such as methyl, ethyl, propyl, butyl, pentyl, 2-ethylhexyl, octyl or decyl radicals;
vinyl and allyl radicals, and
$C_5$-$C_8$ cycloalkyl radicals such as phenyl, tolyl and xylyl radicals.

These crosslinking agents B' are products that are available on the silicones market; furthermore, their use in room-temperature curing compositions is known; it is featured especially in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Among the crosslinking agents B', preference is more particularly given to alkyltrialkoxysilanes, alkyl silicates and polyalkyl silicates, in which the organic radicals are alkyl radicals containing from 1 to 4 carbon atoms.

As other examples of crosslinking agents B' that may be used, mention is more particularly made of polyethyl silicate, poly(n-propyl silicate) and the following silanes: propyltrimethoxysilane, methyltrimethoxysilane, ethyltrimethoxysilane, vinyltriethoxysilane, vinyltrimethoxysilane, methyltriethoxysilane, propyltriethoxysilane, tetramethoxysilane, tetraethoxysilane, tetrapropoxysilane, tetrabutoxysilane 1,2-bis(trimethoxysilyl)ethane, 1,2-bis(triethoxysilyl)ethane, tetraisopropoxysilane, phenyltriethoxysilane, methyltris(methylethylketoximo)silane, 3-cyanopropyltrimethoxy silane, 3-cyanopropyltriethoxysilane, 3-(glycidyloxy)propyltriethoxysilane, vinyltris(methylethylketoximo)silane, tetrakis(methylethylketoximo)silane, acyloxysilanes such as vinyltriacetoxysilane, methyltriacetoxysilane or ethyltriacetoxysilane or alternatively those having the following formulae:

$CH_3Si(OCH_3)_3$; $C_2H_5Si(OC_2H_5)_3$; $C_2H_5Si(OCH_3)_3$
$CH_2$=$CHSi(OCH_3)_3$; $CH_2$=$CHSi(OCH_2CH_2OCH_3)_3$
$C_6H_5Si(OCH_3)_3$; $[CH_3][OCH(CH_3)CH_2OCH_3]Si[OCH_3]_2$
$Si(OCH_3)_4$; $Si(OC_2H_5)_4$; $Si(OCH_2CH_2CH_3)_4$; $Si(OCH_2CH_2CH_3)_4$
$Si(OC_2H_4OCH_3)_4$; $CH_3Si(OC_2H_4OCH_3)_3$; $CH_3Si(OC_2H_5)_3$;

In general, from 0.1 to 60 parts by weight of crosslinking agent B' are used per 100 parts by weight of organosilicon compound A'. Preferably, from 1 to 15 parts by weight are used per 100 parts by weight of organosilicon compound A'.

According to a particularly advantageous embodiment, the composition Z comprises:
(i) at least one organosilicon compound A' comprising at least two identical or different hydrolyzable and condensable groups, or at least two silanol functions =SiOH,
(ii) at least one crosslinking agent B',
(iii) a catalytically effective amount of at least one polycondensation catalyst M which is a zinc complex comprising in its structure two types of ligand: carboxylate and amine.
(iv) at least one compound $L^1$ which exudes at the surface of the antifouling coat when the elastomer network is formed, thus improving the "antifouling" effect,
(v) optionally at least one adhesion promoter E',
(vi) optionally at least one siliceous mineral, organic and/or non-siliceous filler F',
(vii) optionally at least one pigment, a coloring base or a coloring agent H', and
(viii) optionally at least one solvent K'.

Examples of compounds L¹ that exude at the surface of the antifouling coat when the elastomer network is formed, thus improving the "antifouling" effect, are, for example, compounds a), b), c), d), e), f) and g) below:

Compounds a) are polyorganosiloxane oils corresponding to the general formula (II) below:

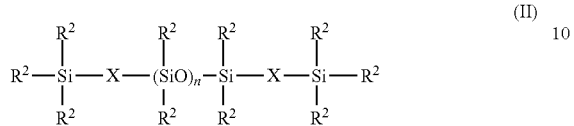

in which:
- R² is an alkyl, aryl or alkenyl radical, methyl and phenyl radicals are preferred (a particularly preferred example being a methylphenylpolysiloxane oil as described, for example, in patent U.S. Pat. No. 4,025,693),
- X is an oxygen atom or a divalent hydrocarbon-based group of 1 to 8 carbon atoms, and
- n is a number defined so as to obtain a diorganopolysiloxane with a viscosity of between 10 and $1\times10^6$ mm²/s at 25° C.

These polyorganosiloxane oils may optionally be grafted and comprise acrylic, amide, amine, carbonyl, carboxylic, carboxylate, thiol, thioether, urea, quaternary ammonium, fluoroalkyl or perfluoroalkyl groups. Grafted or block polydimethylsiloxane oils comprising at least one polyether block (with, for example, polyethylene glycol and/or polypropylene glycol groups) may also be used.

Compound b) is a hydrocarbon-based liquid compound: for example a polyolefin such as an ethylene/propylene copolymer and in particular a low molecular weight polyisobutene (up to 5000 g/mol and preferably between 300 and 500 g/mol).

Compound c) is an organic liquid compound chosen from polydienes, polyesters, polyisocyanates, polyurethanes, polyepoxides, fluoroalkyls, fluoro ethers, lubricant oils (see, for example, patent FR-A-2 375 305) and plasticizers (for example fatty acid esters that may be optionally substituted with heteroatoms or phosphoric acid esters or halohydrocarbon compounds). Polyethylene glycols, polypropylene glycols or castor oil may also be used and they also afford anti-running properties during the application of the composition.

The compounds d) are liquid paraffins and waxy masses such as petrolatum (JP-A-83/013 673).

Compound e) is a thermoplastic polymer such as PVC.

Compound f) is a vinyl chloride/vinyl acetate copolymer (Kokai JP-A-79/026 826).

The compounds g) are cationic, anionic, nonionic or amphoteric surfactants (JP-A-85/258 271).

As examples of adhesion promoters E', examples that may be mentioned include organosilicon compounds simultaneously bearing:

(1) one or more hydrolyzable groups bonded to the silicon atom, and
(2) one or more organic groups substituted with radicals comprising a nitrogen atom or chosen from the group of (meth)acrylate, epoxy and alkenyl radicals, and more preferably still from the group constituted by the following compounds, taken alone or as a mixture:
vinyltrimethoxysilane (VTMO);
3-glycidoxypropyltrimethoxysilane (GLYMO);
methacryloxypropyltrimethoxysilane (MEMO);
[H₂N(CH₂)₃]Si(OCH₂CH₂CH₃)₃,
[H₂N(CH₂)₃]Si(OCH₃)₃
[H₂N(CH₂)₃]Si(OC₂H₅)₃
[H₂N(CH₂)₄]Si(OCH₃)₃
[H₂NCH₂CH(CH₃)CH₂CH₂]SiCH₃(OCH₃)₂
[H₂NCH₂]Si(OCH₃)₃
[n-C₄H₉—HN—CH₂]Si(OCH₃)₃
[H₂N(CH₂)₂NH(CH₂)₃]Si(OCH₃)₃
[H₂N(CH₂)₂NH(CH₂)₃]Si(OCH2CH₂OCH₃)₃
[CH₃NH(CH₂)₂NH(CH₂)₃]Si(OCH₃)₃
[H(NHCH₂CH₂)₂NH(CH₂)₃]Si(OCH₃)₃

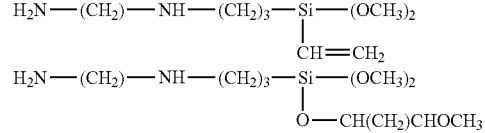

As examples of siliceous, organic and/or non-siliceous mineral F', mention may be made of very finely divided products whose mean particle diameter is less than 0.1 p.m. Among these fillers are fumed silicas and precipitated silicas; their BET specific surface area is generally greater than 40 m²/g. These fillers may also be in the form of more coarsely divided products with an average particle diameter greater than 0.1 p.m. As examples of such fillers, mention may be made of ground quartz, diatomaceous silicas, calcium carbonate, calcined clay, rutile-type titanium oxide, iron, zinc, chromium, zirconium or magnesium oxides, the various forms of alumina (hydrated or unhydrated), boron nitride, lithopone, barium metaborate, barium sulfate and glass microbeads; their specific surface area is generally less than 30 m²/g. These fillers may have been surface-modified by treatment with the various organosilicon compounds customarily employed for this purpose. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505, and British patent GB-A-1 024 234). The treated fillers contain, in most cases, from 3 to 30% of their weight of organosilicon compounds. The fillers may consist of a mixture of several types of fillers of different particle size; thus, for example, they may be constituted of 30 to 70% of finely divided silicas with a BET specific surface area greater than 40 m²/g and of 70 to 30% of more coarsely divided silicas with a specific surface area less than 30 m²/g. The purpose of introducing fillers is to give good mechanical and rheological properties to the elastomers that result from the curing of the compositions according to the invention.

The compositions according to the invention may also advantageously comprise at least one silicone resin (J'). These silicone resins are branched organopolysiloxane polymers which are well known and which are available commercially. They have, per molecule, at least two different units chosen from those of formula R'''₃SiO₁/₂ (M unit), R'''₂SiO₂/₂ (D unit), R'''SiO₃/₂ (T unit) and SiO₄/₂ (Q unit) with at least one of the units being a T or Q unit. The R''' radicals are identical or different and are chosen from linear or branched alkyl radicals or vinyl, phenyl or 3,3,3-trifluoropropyl radicals. Preferably, the alkyl radicals have from 1 to 6 carbon atoms inclusive. More particularly, mention may be made, as examples of alkyl R radicals, of methyl, ethyl, isopropyl, tert-butyl and n-hexyl radicals. These resins are preferably hydroxylated and, in this case, have a weight content of hydroxyl group of between 5 and 500 meq./100 g. Examples of resins that may be mentioned include MQ resins, MDQ resins, TD resins and MDT resins.

The composition Z according to the invention may also comprise a pigment, a coloring base or a coloring agent H'. Examples of pigments H' are, as a guide: red iron oxide, zinc oxide, carbon black, graphite, yellow iron oxide, white titanium oxide, chromium oxide, cobalt oxide, litharge, ultramarine and molybdenum red and yellow, or organic pigments that are known and widely used in the field of aquatic paints. Other common auxiliary agents and additives (thixotropic agents, anti-running agents, etc.) may be incorporated into the composition according to the invention.

Besides the main constituents, the composition Z may comprise nonreactive linear polyorganosiloxane polymers (G'), which may be introduced with the intention of acting on the physical characteristics of the compositions in accordance with the invention and/or on the mechanical properties of the elastomers resulting from the curing of these compositions.

These nonreactive linear polyorganosiloxane polymers (G') are well known; they more especially comprise: α,ω-bis(triorganosiloxy)diorganopolysiloxane polymers with viscosities of at least 10 mPa·s at 25° C., formed essentially from diorganosiloxy units and from at most 1% of monoorganosiloxy and/or siloxy units, the organic radicals bonded to the silicon atoms being chosen from methyl, vinyl and phenyl radicals, 60% at least of these organic radicals being methyl radicals and 10% at most being vinyl radicals. The viscosity of these polymers can reach several tens of millions of mPa·s at 25° C.; they therefore include oils with a fluid to viscous appearance and soft to hard gums. They are prepared according to the usual techniques described more precisely in French patents FR-A-978 058, FR-A-1 025 150, FR-A-1 108 764 and FR-A-1 370 884. Use is preferably made of α,ω-bis(trimethylsiloxy)dimethylpolysiloxane oils with a viscosity ranging from 10 mPa·s to 1000 mPa·s at 25° C. These polymers, which act as plasticizers, may be introduced in a proportion of at most 70 parts by weight, preferably of 5 to 20 parts by weight, per 100 parts by weight of the organosilicon compound A'.

Examples of solvents K' are: aliphatic, cycloaliphatic or aromatic hydrocarbon-based derivatives such as white spirit, cyclohexane, toluene, octamethyltrisiloxane, xylene and ester solvents such as methoxypropyl acetate, n-butyl acetate and 2-ethoxyethyl acetate, acetone, acetonitrile, and also mixtures thereof. The amount of solvent is determined according to the application or the support to be treated so as to obtain a paint of acceptable viscosity.

The compositions according to the invention may be:
one-pack or RTV-1, i.e. packaged in a single airtight packaging, and stable on storage in the absence of moisture, or
two-pack or RTV-2, i.e. packaged in two packages and the components of the composition are separated into two separate fractions, which cure once they are combined the presence of atmospheric moisture.

One-pack bases are described in detail, for example, in patents EP 141 685, EP 147 323, EP 102 268, EP 21 859, FR 2 121 289 and FR 2 121 631, cited as reference.

Two-pack bases are described in detail, for example, in patents EP 118 325, EP 117 772, EP 10 478, EP 50 358, EP 184 966, U.S. Pat. No. 3,801,572 and U.S. Pat. No. 3,888, 815 cited as reference.

An RTV-2 two-pack composition, which is a precursor of composition Z according to the invention, may be in two separate airtight packages P1 and P2, characterized in that:
the package P1 comprises:
a catalytically effective amount of at least one polycondensation catalyst M' according to the invention and as defined above, and
at least one crosslinking agent B' and preferably as defined above, and
the package P2 does not contain said polycondensation catalyst M and said crosslinking agent B' and comprises:
per 100 parts by weight of at least one organosilicon compound A' which is preferably a α,ω-bis(dimethylhydroxysilyl)polydimethylsiloxane whose dynamic viscosity at 25° C. is between 500 mPa·s and 100 000 mPa·s and preferably between 1000 mPa·s and 10000 mPa·s, and
from 0 to 10 part(s) by weight of water.

One of the advantages of these novel RTV-2 compositions according to the invention over conventional polycondensation RTV-2 products using dialkyltin dicarboxylate catalysts is that it is no longer necessary to add water to the part P2 since the catalyst according to the invention does not need to be activated, thus simplifying the formulation.

Any material that is used in an aquatic environment and that is subject to fouling may be a support (1) for the present invention. Possible supports are boat construction materials, such as steel, aluminum, wood, resin-impregnated glass fibers and any other composite material. Materials used for pipes, such as concrete, plastics, steel, iron and other metals, may also be coated. Tanks containing water, including swimming pools, are subject to fouling. The materials used for manufacturing tanks are identical or similar to those used for manufacturing pipes.

When an antifouling coat (4) (or top coat) according to the invention is used, it may be combined with an adhesion-promoting coat (3) (or tie coat) of diverse and varied nature. For example, it may be made of polyurethane, of optionally chlorinated natural or synthetic rubber, such as chloroprene and neoprene, or of butyral/silicone rubber (Kokai JP-A-78/137 231, JP-A-78/137 233 and JP-A-78/137 234). According to another approach, for example described in patent U.S. Pat. No. 5,449,553, a tie coat is described and is prepared from a composition that is curable in atmospheric moisture comprising a tin-based polycondensation catalyst, a crosslinking agent such as ethyl silicate and a copolymer derived from the product of reaction of a silylhydroxy-terminated organopolysiloxane with a polymerizable monomer such as a styrene or a conjugated diolefin, for instance 1,3-butadiene. According to another example described in patent EP-1 670 866, a tie coat is formed from a composition comprising:
(i) from 0 to 60% by wet weight of pigments and fillers; and
(ii) the remainder being a binder-based phase comprising:
from 1% to 90% by wet weight of one or more polysiloxanes bearing amine functions,
from 1% to 90% by wet weight of one or more polysiloxanes bearing epoxy functions, and
from 0 to 20% by wet weight of an adhesion promoter chosen from the group consisting of polysiloxanes bearing hydroxyl functions, polysiloxanes bearing hydroxyalkyl functions and polysiloxanes bearing $C_1$-$C_4$ alkoxy functions.

The invention also relates to a process for applying an antifouling coat (4) to a support (1) intended to be used in aquatic applications, comprising the following steps:
a) at least one primer coat (2) comprising at least one anticorrosion product is optionally deposited on said support (1),
b) an adhesion-promoting coat (3) is deposited on said primer coat (2) or on said support (1) when the primer coat (2) is absent,
c) said adhesion-promoting coat (3) is cured,
d) an antifouling coat (4) is deposited on said adhesion-promoting coat (3), and
e) said antifouling coat (4) is cured on contact with atmospheric moisture, and
said process being characterized in that the antifouling coat (4) and optionally the adhesion-promoting coat (3) are prepared from the composition Z according to the invention and as defined above.

The thickness of the coats applied may vary and films from 12 to 1000 microns in thickness (on condition that the deposit is uniform) have given good results. The typical thickness of the various coats is about 50 μm for the primer, 150 μm for the tie coat and 150 μm for the top coat. Needless to say, a person skilled in the art will know how to adapt the thickness of the various coats as a function of the desired result.

The final subject of the invention concerns a use of the composition Z according to the invention and as defined above for forming, after curing on contact with atmospheric moisture, an antifouling coat (4) on an article so as to protect it against the adhesion of aquatic organisms.

Thus, the composition Z according to the invention may be used as a "fouling-release coating" paint, which, after curing by means of atmospheric moisture or by adding water, give the surface of the treated support ultra-smooth properties, with low friction forces and low surface energies. It is these physical properties which prevent the fouling from adhering.

Other advantages and features of the present invention will appear on reading the following examples that are given by way of illustration and that are in no way limiting.

EXAMPLES

Example 1

Preparation of the [Zn(carboxylate)$_2$(amine)$_n$] catalysts a) Preparation of the complexes [Zn(2-ethylhexanoate)$_2$(amine)$_n$], [Zn(naphthenate)$_2$(amine)$_n$] and [Zn(neodecanoate)$_2$(amine)$_n$]

125.44 g of a solution of sodium methoxide at 30.1% by weight in methanol (0.7 mol) are added over 1 hour to a solution of 121.1 g of neodecanoic acid (0.7 mol) or 165.9 g of naphthenic acid or 102 g of 2-ethylhexanoic acid at 99% in 300 g of toluene. Next, a solution of zinc chloride in slight excess (49.92 g at 98% by weight, 0.359 mol) in 50 g of methanol is added over 40 minutes. The methanol/toluene azeotrope is distilled off over 2 hours. The reaction mixture is cooled to room temperature and the sodium chloride is then filtered off. The clear, colorless solution is evaporated to dryness (up to 70° C., 1 mbar) to give a viscous oil: 143.3 g of zinc neodecanoate or 229.2 g of zinc naphthenate or 123.2 g of zinc 2-ethylhexanoate (100% yield).

The amines (n-octylamine, di(n-octyl)amine), N,N-dibutylamine, bis(2-ethylhexyl)amine, diisononylamine, N,N-dimethyl-N-butylamine, 3-aminopropyltrimethoxysilane, aminoethyl-aminopropyltrimethoxysilane, aminopropyltriethoxysilane or 3-aminopropylmethyldiethoxysilane are added without solvent with vigorous stirring to the zinc carboxylates at the desired stoichiometry (either at least 2 molar equivalents of amine when it is desired predominantly to prepare a diamino zinc dicarboxylate complex, or between 1 and 2 equivalents when it is desired to prepare a monoamino or diamino mixture of the corresponding zinc dicarboxylate complexes, or close to 1 equivalent when it is desired predominantly to prepare the corresponding monoamino zinc dicarboxylate complex. The desired complexes are obtained, in the form of a sparingly viscous liquid. The complexation reaction is exothermic. A solvent that is compatible with the application may be used to dilute the zinc carboxylate, for instance heavy petroleum fractions or mixtures of alkanes and/or of alkylaromatics.

Depending on the carboxylates, the nature of the amines and the amounts of amine added, the following complexes are obtained:
[Zn(naphthenate)$_2$(bis(2-ethylhexyl)amine)],
[Zn(naphthenate)$_2$(bis(2-ethylhexyl)amine)$_2$],
[Zn(naphthenate)$_2$(diisononylamine)],
[Zn(naphthenate)$_2$(diisononylamine)$_2$],
[Zn(naphthenate)$_2$(di(n-octyl)amine)],
[Zn(naphthenate)$_2$(di(n-octyl)amine)$_2$],
[Zn(naphthenate)$_2$(n-octylamine)],
[Zn(naphthenate)$_2$(n-octylamine)$_2$],
[Zn(naphthenate)$_2$(N,N-dibutylamine)],
[Zn(naphthenate)$_2$(N,N-dibutylamine)$_2$],
[Zn(naphthenate)$_2$(N,N-dimethyl-N-butylamine)$_2$],
[Zn(naphthenate)$_2$(N,N-dimethyl-N-butylamine)$_2$],
[Zn(naphthenate)$_2$(aminoethyl-aminopropyltrimethoxysilane)],
[Zn(naphthenate)$_2$(aminoethyl-aminopropyltrimethoxysilane)$_2$],
[Zn(naphthenate)$_2$(aminopropyltriethoxysilane)],
[Zn(naphthenate)$_2$(aminopropyltriethoxysilane)$_2$],
[Zn(neodecanoate)$_2$(di(n-octyl)amine)],
[Zn(neodecanoate)$_2$(di(n-octyl)amine)]$_2$],
[Zn(neodecanoate)$_2$(n-octylamine)],
[Zn(neodecanoate)$_2$(n-octylamine)$_2$],
[Zn(neodecanoate)$_2$(N,N-dibutylamine)],
[Zn(neodecanoate)$_2$(N,N-dibutylamine)$_2$],
[Zn(neodecanoate)$_2$(3-aminopropyltrimethoxysilane)$_2$],
[Zn(neodecanoate)$_2$(3-aminopropylmethyldiethoxysilane)$_2$],
[Zn(neodecanoate)$_2$(aminoethyl-aminopropyltrimethoxysilane)],
[Zn(neodecanoate)$_2$(aminoethyl-aminopropyltrimethoxysilane)$_2$],
[Zn(neodecanoate)$_2$(aminopropyltriethoxysilane)],
[Zn(neodecanoate)$_2$(aminopropyltriethoxysilane)$_2$],
[Zn(neodecanoate)$_2$(bis(2-ethylhexyl)amine)],
[Zn(neodecanoate)$_2$(bis(2-ethylhexyl)amine)$_2$],
[Zn(neodecanoate)$_2$(diisononylamine)],
[Zn(neodecanoate)$_2$(diisononylamine)$_2$],
[Zn(2-ethylhexanoate)$_2$(N,N-dibutylamine)],
[Zn(2-ethylhexanoate)$_2$(N,N-dibutylamine)$_2$],
[Zn(2-ethylhexanoate)$_2$(n-octylamine)],
[Zn(2-ethylhexanoate)$_2$(n-octylamine)$_2$],
[Zn(2-ethylhexanoate)$_2$(bis(2-ethylhexyl)amine)],
[Zn(2-ethylhexanoate)$_2$(bis(2-ethylhexyl)amine)$_2$],
[Zn(2-ethylhexanoate)$_2$(diisononylamine)], and
[Zn(2-ethylhexanoate)$_2$(diisononylamine)$_2$].

The abbreviations for the ligands listed in the formulae in the tables below are as follows:
neodecanoate=ND
naphthenate=NAPH
n-octylamine=OA
di(n-octyl)amine)=DOA
N,N-dibutylamine=DBA
N,N-dimethyl-N-butylamine=DMBA In the case where a variable amount of amine is used in the synthesis (>0 equivalent and ≤2 equivalents, or a slight excess), a mixture is obtained comprising the following complexes: [Zn(carboxylate)$_2$ (amine)]+[Zn(carboxylate)$_2$ (amine)$_2$]. In this case, the following nomenclature will then be used: Zn(carboxylate)$_2$(amine)$_x$]* and the value of the symbol "x" will refer to the number of moles of amine added during the preparation of the complex relative to the zinc and which has reacted (i.e. which is present in the complex as a ligand). This type of nomenclature will be identified in the examples by the use of the symbol "*" in the formula of the complex.

All the structures were confirmed by $^1$H NMR analysis, in CDCl$_3$ solvent.

Example 2

RTV-2 Two-Pack Composition—Polyethyl Silicate Crosslinking Agent (a1): hydroxylated polydimethylsiloxane oil with a viscosity of 14 000 mPa·s at 25° C. and blocked at each of the chain ends with a siloxyl unit M$^{OH}$ having the following formula: $(CH_3)_2(OH)SiO_{1/2}$, (b1): fumed silica with a BET specific surface area of 200 m$^2$/g, treated with hexamethyldisilazane (HMDZ), dispersed in a mixture of hydroxylated polydimethylsiloxane oil (a1) and of a polydimethylsiloxane oil blocked at each of the chain ends with a siloxyl unit M having the following formula $(CH_3)_3SiO_{1/2}$;

(b2): ground quartz with a mean particle diameter of 10 μm;

(d1): catalyst tested;

(e): polyethyl silicate.

represent the number of carboxylate ligands and
To do this, a slurry is prepared from the following constituents:
20.4 g of an α,ω-dihydroxylated oil (a1),
61.3 g of a filler (b1), and
18.3 g of a filler (b2), to which are added 1.5 g of polyethyl silicate (crosslinking agent) per 100 g of slurry and x grams (y mmol) of the catalyst to be tested (d1).

For the zinc catalysts (according to the invention or for the comparative), the amounts tested are added to 1.5 ml of the solvent methyl tert-butyl ether (MTBE).

TABLE 1

Constituents of the RTV-2 compositions tested (polyethyl silicate crosslinking agent).

| Ingredients | Examples according to the invention (grams) | Comparative (UL28) (grams) |
| --- | --- | --- |
| (a1) | 20.4 | 20.4 |
| (b1) | 61.3 | 61.3 |
| (b2) | 18.3 | 18.3 |
| (e) | 1.5 g per 100 g | 1.5 |
| (d1) | 2.66 mmol per 100 g of slurry | 0.886 mmol per 100 g of composition (0.44 g) |

In RTV-2, the tests are performed directly on a mixture consisting of ingredients (a1), (b1), (b2) and (e), to which is added and mixed the catalyst to be tested (d1). The working time or pot life is first measured (time after which the viscosity of the mixture prevents its use, i.e. the time required for the formation of a gel), and, from another mixture, a slug 6 mm thick is then cast and, after curing, the Shore A hardnesses (above and below) of a demolded slug 6 mm thick are measured under regulated conditions (23° C. and 50% relative humidity) and over increasing times. In the tables of results, the symbol ">" corresponds to the hardness values measured on the upper part of the slug and the symbol "<" corresponds to the hardness values measured on the lower part of the slug that is less exposed to the ambient air than the upper part. Measurement of the Shore A hardness, noted SAH=measurements performed according to the indications of standard ASTM-D 2240. The working time or pot life is the time beyond which the viscosity of the mixture prevents its use.

Two catalysts in comparative tests:
dimethyltin dineodecanoate (UL28) (test 1bis), and
[Zn(ND)$_2$] with ND=neodecanoate=>[Zn(carboxylate)$_2$]

TABLE 2

RTV-2 tests-polyethyl silicate crosslinking agent and [Zn(neodecanoate)$_2$(amine)$_n$] complexes

| | | | | Shore A hardness on 6 mm | | | |
| | Catalyst tested | mg per 50 g of | Working | 1 day | | 4 days | |
| Tests | (d1) | slurry | time (mn) | > | < | > | < |
| --- | --- | --- | --- | --- | --- | --- | --- |
| 1 | [Zn(ND)2)] | 544 | >2 days | — | — | — | — |
| 1bis | UL28 | 220 | 40 | 24 | 23 | 26 | 26 |
| 2 | [Zn(ND)$_2$(OA)] | 716 | 157 | 10 | 6 | 20 | 17 |
| 3 | [Zn(ND)$_2$(OA)$_{1.5}$] * | 802 | 73 | 17 | 14 | 19 | 18 |
| 4 | [Zn(ND)$_2$(OA)$_2$] | 888 | 32 | 17 | 15 | 18 | 17 |
| 5 | [Zn(ND)$_2$(DBA)] | 716 | 120 | 10 | 7 | 19 | 16 |
| 6 | [Zn(ND)$_2$(DBA)$_{1.5}$] * | 802 | 53 | 16 | 13 | 20 | 18 |
| 7 | [Zn(ND)$_2$(DBA)$_2$] | 888 | 39 | 17 | 13 | 20 | 18 |

*In the case where 1.5 equivalents of amine are used relative to the zinc for the preparation of the catalyst, a mixture of complexes is obtained comprising 1 amine ligand or 2 amine ligands (which may also be in an oligomeric form) and, in this case, the nomenclature used to describe the complex is as follows: [Zn(carboxylate)$_2$(amine)$_{1.5}$].

For test 1 (comparative catalyst [Zn(ND)$_2$]), the slug was not hard enough to measure an SAH hardness after 1, 4 or 7 days (hence the symbol "-" in Table 2).

TABLE 3

RTV-2 tests-polyethyl silicate crosslinking agent and [Zn(naphthenate)$_2$(amine)$_n$] complexes

| | | | | Shore A hardness on 6 mm | | | |
|---|---|---|---|---|---|---|---|
| | Catalyst tested | mg per 50 g of | Working | 1 day | | 4 days | |
| Tests | (d1) | slurry | time | > | < | > | < |
| 8 | [Zn(NAPH)$_2$] | 714 | 48 h | — | — | — | — |
| 9 | [Zn(NAPH)$_2$(OA)] | 886 | 3 h 06 | 7 | 6 | 17 | 16 |
| 10 | [Zn(NAPH)$_2$(OA)$_2$] | 1058 | 30 min | 16 | 16 | 17 | 16 |
| 11 | [Zn(NAPH)$_2$(DBA)] | 886 | 2 h 48 min | 8 | 6 | 18 | 16 |
| 12 | [Zn(NAPH)$_2$(DBA)$_2$] | 1058 | 46 min | 17 | 15 | 19 | 18 |
| 13 | [Zn(NAPH)$_2$(DMBA)] | 849 | 7 h 15 min | <1 | <1 | 6c | 6 |
| 14 | [Zn(NAPH)$_2$(DMBA)$_2$] | 983 | 5 h 25 min | <1 | <1 | 14c | 15 |

For test 8 (comparative catalyst [Zn(NAPH)$_2$]), the slug was not hard enough to measure an SAH hardness after 1, 4 or 7 days (hence the symbol "-" in Table 3).

TABLE 4

RTV-2 tests-polyethyl silicate crosslinking agent and [Zn(2-ethylhexanoate naphthenate)$_2$(amine)$_n$] complexes

| | | | | Shore A hardness on 6 mm | | | |
|---|---|---|---|---|---|---|---|
| | Catalyst tested | mg per 50 g of | Working | 1 day | | 4 days | |
| Tests | (d1) | slurry | time | > | < | > | < |
| 15 | [Zn(2-ethylhexanoate)$_2$] | 468 | 48 h | — | — | — | — |
| 16 | [Zn(2-ethylhexanoate)$_2$ (DBA)] | 639 | 80 min | 13 | 12 | 24 | 21 |
| 17 | [Zn(2-ethylhexanoate)$_2$ (DBA)$_2$] | 811 | 40 min | 17 | 14 | 16 | 19 |

For test 15 (comparative catalyst [Zn(2-ethylhexanoate)$_2$], the slug was not hard enough to measure an SAH hardness after 1 and 4 days (hence the symbol "-" in Table 4).

Example 3

Preparation of an Antifouling Top Coat According to the Invention

A sanded and degreased steel metal plate is coated with an epoxy primer coat (prepared from SigmaShield 610® sold by the company Sigma coatings) about 50 μm thick. After 72 hours of drying at room temperature, an adhesion-promoting tie coat (prepared from SigmaGlide 790® sold by the company Sigma coatings) about 150 microns thick is applied. After 48 hours of drying at room temperature, a coat of about 150 μm of the top coat prepared from each test formulation (tests 2 to 17) and described in Example 2 (RTV-2 compositions) is applied.

After drying for 48 hours at room temperature, the plate is immersed in a marine medium (in seawater) and is examined after 12 and 23 weeks of immersion.

After washing thoroughly with water, the antifouling evaluation is 100 for all the formulations tested, which indicates the total absence of organisms on the coated plate.

An antifouling metal plate pretreated with a coat of epoxy primer and an adhesion-promoting "tie coat" (prepared from the products Sigmaglide 790 sold by the company Sigma Coatings) is coated with 250 microns. After leaving the coating to cure at room temperature, the plate is immersed in seawater and is examined after 14 and 23 weeks of immersion.

After washing abundantly with water, the antifouling evaluation is 100, which indicates the total absence of organisms on the coated plate.

The invention claimed is:

1. An article with antifouling properties for use in aquatic applications, comprising:
   a) a support,
   b) at least one adhesion-promoting coat deposited on said support, and
   c) at least one antifouling coat deposited on said adhesion-promoting coat, wherein said antifouling coat is obtained after deposition and curing on contact with atmospheric moisture a composition Z comprising:
      (i) at least one organosilicon compound A' comprising at least two identical or different hydrolyzable and condensable groups, or at least two silanol functions ≡SiOH,
      (ii) at least one crosslinking agent B', and (iii) a catalytically effective amount of at least one polycondensation catalyst M which is a zinc complex comprising in its structure two types of ligand: carboxylate and amine.

2. The article as claimed in claim 1, comprising:
a) a support,
b) at least one primer coat deposited on said support comprising at least one anticorrosion product,
c) at least one adhesion-promoting coat deposited on said primer coat, and
d) at least one antifouling coat deposited on said adhesion-promoting coat, said article being characterized in that said antifouling coat is obtained after deposition and curing on contact with atmospheric moisture of a composition Z comprising:
(i) at least one organosilicon compound A' comprising at least two identical or different hydrolyzable and condensable groups, or at least two silanol functions $\equiv$SiOH,
(ii) at least one crosslinking agent B', and
(iii) a catalytically effective amount of at least one polycondensation catalyst M which is a zinc complex comprising in its structure two types of ligand: carboxylate and amine.

3. The article as claimed in claim 1, wherein composition Z comprises:
(i) at least one organosilicon compound A' comprising at least two identical or different hydrolyzable and condensable groups, or at least two silanol functions $\equiv$SiOH,
(ii) at least one crosslinking agent B', and
(iii) a catalytically effective amount of at least one polycondensation catalyst M which is a complex of formula (1') below:

$$[Zn(C^1)_{n'}(C^2)_{n''}(L^1)_{y'}(L^2)_{y''}(X)_{x'}]_{z'} \cdot (H_2O)_{x''} \quad (1')$$

in which:
the symbols $C^1$ and $C^2$ are identical or different ligands chosen from the group of carboxylates,
the symbols n' and n" represent the number of carboxylate ligands and are integers equal to 0, 1 or 2 with the condition that the sum n'+n"=2,
the symbols $L^1$ and $L^2$ are identical or different ligands chosen from the group of amines,
the symbols y' and y" represent the number of amine ligands and are integers equal to 0, 1 or 2 with the condition that the sum y'+y"=1 or 2,
the symbol X is a ligand other than $C^1$, $C^2$, $L^1$ and $L^2$,
the symbol x'≥0,
the symbol x"≥0, and
the symbol z' is an integer greater than or equal to 1.

4. The article as claimed in claim 3, in which the ligands of amine type $L^1$ or $L^2$ are chosen from the group consisting of primary monoamines of alkylamine type containing in total from 1 to 40 carbon atoms for the alkyl radical, secondary monoamines of dialkylamine type containing in total from 2 to 40 carbon atoms for the alkyl radicals, tertiary monoamines of trialkylamine type containing in total from 3 to 60 carbon atoms for the alkyl radicals, alkyl diamines containing in total from 1 to 40 carbon atoms for the alkyl radicals and amino silanes.

5. The article as claimed in claim 3, in which the ligands of amine type $L^1$ and $L^2$ are chosen from the group consisting of the following amines: N,N-dimethylethylenediamine, N,N'-dimethylethylenediamine, N,N,N'-trimethylethylenediamine, N,N'-diisopropylethylenediamine, n-butylamine, n-propylamine, n-heptylamine, n-octylamine, n-nonylamine, tert-butylamine, isopropylamine, 2-ethylhexylamine, decylamine, dodecylamine, which may be linear or branched, N-methyl-N-butylamine, N,N-dipropylamine, N,N-diisopropylamine, N-ethyl-N-butylamine, N,N-dibutylamine, N,N-dimethyl-N-butylamine, di(n-octyl)amine, N-n-propylethylenediamine, N,N,N',N'-tetramethylethylenediamine, 3-aminopropyltrimethoxysilane and 3-aminopropylmethyldiethoxysilane.

6. The article as claimed in claim 3, in which the polycondensation catalyst M comprises the ligands of carboxylate type $C^1$ and $C^2$ which are chosen from the group consisting of the carboxylates of empirical formula $[C_{10}H_9O_2]^-$.

7. The article as claimed in claim 3, wherein the symbol X is a neutral ligand other than an amine,
the symbol x'=0, 1, 2, 3 or 4,
the symbol x"=0, 1, 2, 3 or 4, and
the symbol z'=1 or 2.

8. The article as claimed in claim 1, wherein the polycondensation catalyst M is a complex of formula (2') below:

$$[Zn(C^1)_{n'}(C^2)_{n''}(L^1)_{y'}(L^2)_{y''}]_{z'} \quad (2')$$

in which:
the symbols $C^1$ and $C^2$ are identical or different ligands chosen from the group of carboxylates,
the symbols n' and n" represent the number of carboxylate ligands and are integers equal to 0, 1 or 2 with the condition that the sum n'+n"=2,
the symbols $L^1$ and $L^2$ are identical or different ligands chosen from the group of amines,
the symbols y' and y" represent the number of amine ligands and are integers equal to 0, 1 or 2 with the condition that the sum y'+y"=1 or 2, and
the symbol z' is an integer greater than or equal to 1.

9. The article as claimed in claim 1, wherein the polycondensation catalyst M is a complex of formula (3') below:

$$[(Zn(C^1)_2)(L^1)_{y'}]_{z'} \quad (3')$$

in which:
the symbol $C^1$ is a ligand chosen from the group of carboxylates,
the symbol $L^1$ is a ligand chosen from the group of amines,
the symbol y' is a number equal to 1 or 2, and
the symbol z' is an integer greater than or equal to.

10. The article as claimed in claim 1, wherein the polycondensation catalyst M is a complex of formula (3') below:

$$[(Zn(C^1)_2)(L^1)_{y'}]_{z'} \quad (3')$$

in which:
the symbol $C^1$ is a neodecanoate ligand, naphthenate ligand or a 2-ethylhexanoate ligand,
the symbol $L^1$ is a ligand chosen from the group consisting of the following compounds: N,N-dimethylethylenediamine, N,N'-dimethylethylenediamine, trimethylethylenediamine, N,N,N'-diisopropylethylenediamine, n-butylamine, n-propylamine, n-heptylamine, n-octylamine, n-nonylamine, tert-butylamine, isopropylamine, 2-ethylhexylamine, decylamine, dodecylamine, which may be linear or branched, N-methyl-N-butylamine, N,N-dipropylamine, N,N-diisopropylamine, N-ethyl-N-butylamine, N,N-dibutylamine, N,N-dimethyl-N-butylamine, di(n-octyl)amine, N-n-propylethylenediamine, N,N'-dimethylethylenediamine, N,N,N',N'-tetramethylethylenediamine, 3-aminopropyltrimethoxysilane and 3-aminopropylmethyldiethoxysilane,
the symbol y' is an integer equal to 1 or 2, and
the symbol z'=1, 2, 3 or 4.

11. The article as claimed in claim 1, in which the polycondensation catalyst M is obtained:
a) by reacting, per 1 mol of at least one zinc dicarboxylate of formula [Zn(carboxylate)$_2$] or of a mixture of two different zinc carboxylates, mol of amine or of a mixture of amines optionally in the presence of a solvent, so as to obtain a reaction product comprising: $X^2$ mol of at least:
x mol % of a zinc complex A which is a [Zn(carboxylate)$_2$(amine)]$_{z'}$ complex,
y mol % of a zinc complex B which is a [Zn(carboxylate)$_2$(amine)$_2$]$_{z'}$ complex,
or a mixture of x+y mol % of zinc complex A and of zinc complex B,
with x≥0, y≥0, x+y=100, and the symbol z' is an integer greater than or equal to 1,
optionally $X^3$ mol of the [Zn(carboxylate)$_2$] complex, and
optionally $X^4$ mol of residual unreacted amine, and
b) after optionally removing the solvent and the residual amine, the polycondensation catalyst(s) M are recovered in the form of at least one zinc complex A, of at least one zinc complex B or of a mixture of zinc complex A and of zinc complex B, optionally with a residual amount of $X^3$ mol of the [Zn(carboxylate)$_2$] complex,
with the symbols $X^2$, $X^3$ and $X^4$ being numbers and the sum $X^2+X^3=1$.

12. The article as claimed in claim 1, in which the organosilicon compound A' is a polyorganosiloxane comprising:
(i) at least two siloxyl units of formula (4') below:

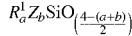   (4')

in which:
the symbols $R^1$, which may be identical or different, represent $C_1$ to $C_{30}$ monovalent hydrocarbon-based radicals,
the symbols Z, which may be identical or different, each represent a hydrolyzable and condensable group or a hydroxyl group,
a is equal to 0, 1 or 2, b is equal to 1, 2 or 3, the sum a+b is equal to 1, 2 or 3,
(ii) and optionally one or more siloxyl units of formula (5') below:

   (5')

in which:
the symbols R, which may be identical or different, represent $C_1$ to $C_{30}$ monovalent hydrocarbon-based radicals optionally substituted with one or more halogen atoms or with amino, ether, ester, epoxy, mercapto or cyano groups, and
the symbol c is equal to 0, 1, 2 or 3.

13. The article as claimed in claim 1, in which the crosslinking agent B' is a silicon compound, each molecule of which comprises at least three hydrolyzable and condensable groups Y and said crosslinking agent B' having formula (7') below:

   (7')

in which formula:
the symbol R' is a monovalent hydrocarbon-based radical comprising from 1 to 30 carbon atoms,
the symbol Y is an alkoxy, alkoxy-alkylene-oxy, amino, amido, acylamino, aminoxy, iminoxy, ketiminoxy, acyloxy or enoxy group,
the symbol a=3 or 4.

14. The article as claimed in claim 1, wherein the composition Z comprises:
(i) at least one organosilicon compound A' comprising at least two identical or different hydrolyzable and condensable groups, or at least two silanol functions ≡SiOH,
(ii) at least one crosslinking agent B',
(iii) a catalytically effective amount of at least one polycondensation catalyst M which is a zinc complex comprising in its structure two types of ligand: carboxylate and amine,
(iv) at least one compound L' which exudes at the surface of the antifouling coat when the elastomer network is formed, thus improving "antifouling" effect,
(v) optionally at least one adhesion promoter E',
(vi) optionally at least one siliceous mineral, organic and/or non-siliceous filler F',
(vii) optionally at least one pigment, a coloring base or a coloring agent H', and
(viii) optionally at least one solvent K'.

15. The article as claimed in claim 14, wherein the composition Z comprises:
(v) at least one adhesion promoter E',
(vi) at least one siliceous mineral, organic and/or non-siliceous filler F',
(vii) at least one pigment, a coloring base or a coloring agent H', and
(viii) at least one solvent K'.

16. A process for applying an antifouling coat to a support intended to be used in aquatic applications, comprising:
a) at least one primer coat comprising at least one anti-corrosion product is optionally deposited on said support,
b) an adhesion-promoting coat is deposited on said primer coat or on said support when the primer coat is absent,
c) said adhesion-promoting coat is cured,
d) an antifouling coat is deposited on said adhesion-promoting coat, and
e) said antifouling coat is cured on contact with atmospheric moisture,
said process being characterized in that the antifouling coat and optionally the adhesion-promoting coat are prepared from the composition Z as defined according to claim 1.

17. A composition Z that can form after curing on contact with atmospheric moisture, an antifouling coat on an article so as to protect said article against adhesion of one or more aquatic organisms,
wherein composition Z comprises:
(i) at least one organosilicon compound A' comprising at least two identical or different hydrolyzable and condensable groups, or at least two silanol functions ≡SiOH,
(ii) at least one crosslinking agent B', and (iii) a catalytically effective amount of at least one polycondensation catalyst M which is a zinc complex comprising in its structure two types of ligand: carboxylate and amine.

\* \* \* \* \*